Figure 1:
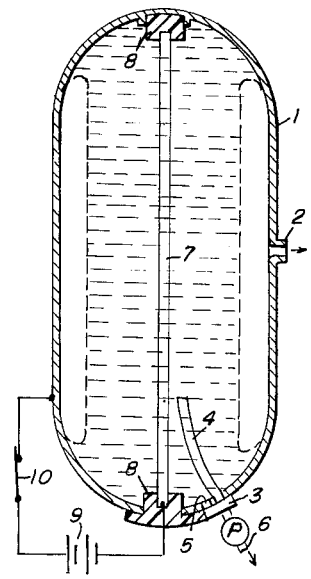

Aug. 24, 1965   J. P. BARGER   3,202,160
METHOD AND APPARATUS FOR ORIENTING FLUIDS
IN ZERO GRAVITY FIELDS
Filed May 24, 1961   3 Sheets-Sheet 1

INVENTOR
J. P. BARGER

BY Fischer, Christen and Goodson
ATTORNEYS

Aug. 24, 1965      J P BARGER      3,202,160
METHOD AND APPARATUS FOR ORIENTING FLUIDS
IN ZERO GRAVITY FIELDS
Filed May 24, 1961      3 Sheets-Sheet 2

INVENTOR
J. P. BARGER

BY Fisher, Christen and Goodson
ATTORNEYS

Aug. 24, 1965    J P BARGER    3,202,160
METHOD AND APPARATUS FOR ORIENTING FLUIDS
IN ZERO GRAVITY FIELDS
Filed May 24, 1961    3 Sheets-Sheet 3

INVENTOR
J. P. BARGER

BY Fisher, Christen and Goodson

ATTORNEYS

United States Patent Office 3,202,160
Patented Aug. 24, 1965

3,202,160
METHOD AND APPARATUS FOR ORIENTING
FLUIDS IN ZERO GRAVITY FIELDS
J P Barger, Arlington, Mass., assignor to Dynatech
Corporation, Cambridge, Mass., a corporation of
Massachusetts
Filed May 24, 1961, Ser. No. 112,426
23 Claims. (Cl. 137—1)

This invention relates to a method and apparatus for orienting fluids in zero gravity fields. In particular this invention is directed to positioning a dielectric liquid within a predetermined area in a zero gravity field while any gases present in the vicinity will be excluded from said area and, more particularly, to selectively positioning liquids, and gases associated therewith, within tanks, receptacles, containers, etc., in zero gravity fields.

The particular problems associated with zero gravity fields and liquids therein are related to the wetting characteristics of the particular liquid-wall combination. In the case of a wetting fluid such as hydrogen, the liquid normally can be predominantly located on the tank walls with the associated gas or vapor as a bubble within said liquid. This is undesirable since, in this configuration, the liquid is presented as a relatively large area for heat transfer through the tank walls to the liquid, favoring vaporization thereof. Furthermore, the location of the liquid relative to a pump inlet for removal thereof is uncertain. In addition, the venting of vapor associated with the liquid is difficult since the vapor is substantially surrounded by the liquid.

In the case of a non-wetting liquid, the liquid is predominantly located in the center of the tank forming a liquid core with the vapor being predominantly located near the tank walls. This configuration is desirable from a heat transfer liquid removal and venting viewpoint; however, there is no assurance that small random acceleration of the vehicle will not cause the core of liquid to strike the tank walls with a resulting breakup of the liquid into smaller randomly distributed spheres, presenting problems in heat transfer, liquid removal and venting.

A principal object of this invention is to provide a positioning or orienting body force on the liquid so that its location within a tank containing same can be selectively and positively controlled.

Another object of this invention is to provide a positive pressure to a liquid at a desired location, e.g., at the inlet to a turbo-pump to aid in reducing the cavitation which tends to occur during the starting of the pump, particularly at such time when the liquid is in saturated state.

Another object is the provision of a method and apparatus for positively positioning a liquid in a zero gravity field.

Another object is the provision of a method and apparatus for positioning a liquid in a container in a zero gravity field such that the liquid contents are located in the central portions thereof and the gaseous contents line the inner walls of said container thereby reducing the heat transfer to the liquid from the container walls.

Another object is to provide a method and apparatus for selectively positioning the liquid and gaseous contents of a container in a zero gravity field to positively position said gaseous contents to permit venting and thus avoid undue pressures on said container upon removal of said liquid contents.

Another object is the provision of a method and apparatus for selectively positioning a liquid within a container in a zero gravity field in such a manner to minimize impact of said liquid on the container and associated parts due to sudden accelerations, e.g., during re-start of a vehicle carrying said container.

A still further object is to provide a method and apparatus for pressurizing a zero gravity field liquid in the region of a pump inlet thereby reducing the tendency of said liquid to cavitate during re-start of said pump.

apparatus for selectively positioning liquid and gaseous components in a zero gravity field to effect the positive, substantial separation thereof.

Figure 6:
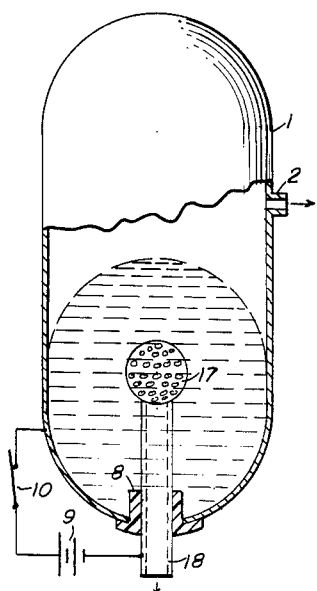
Figure 7:
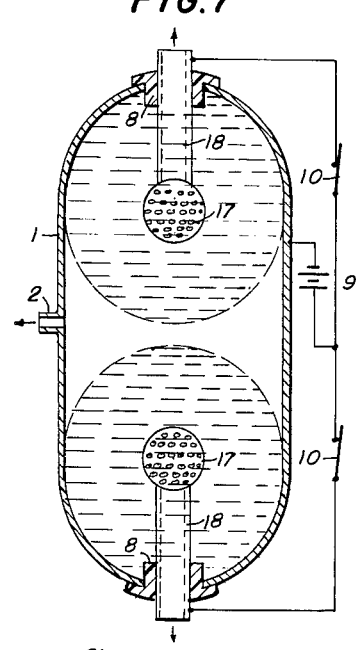
Figure 8:
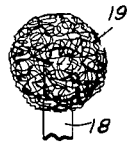
Figure 9:
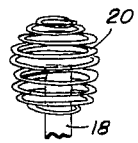
Figure 10:
Figure 11:
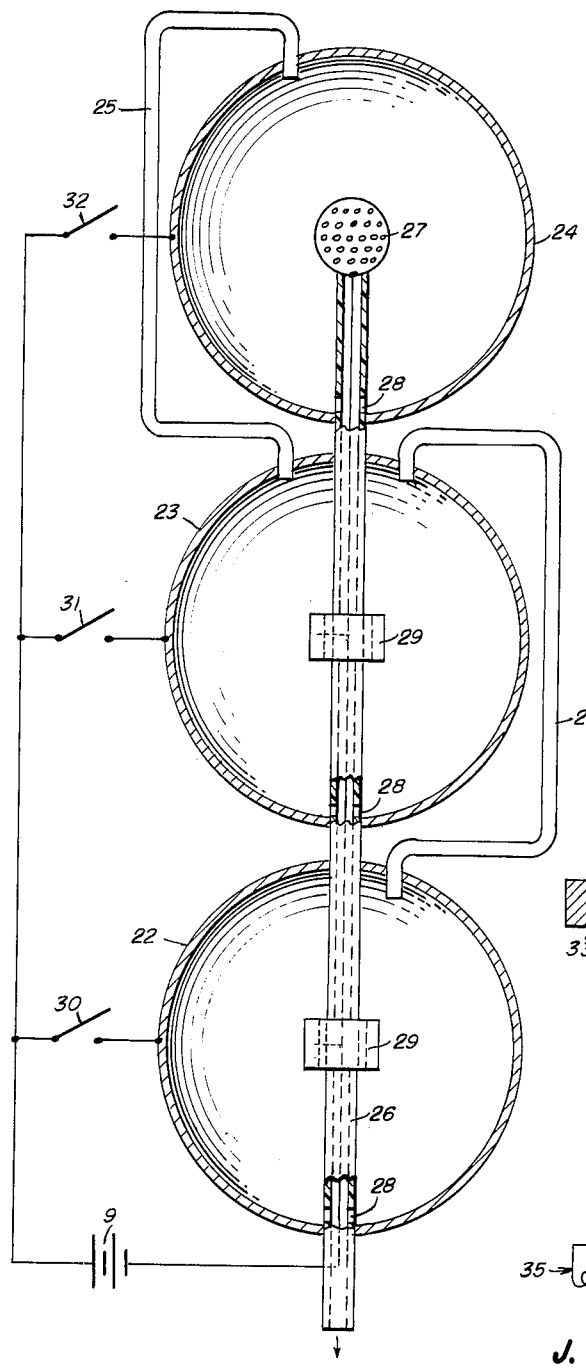
Figure 12:
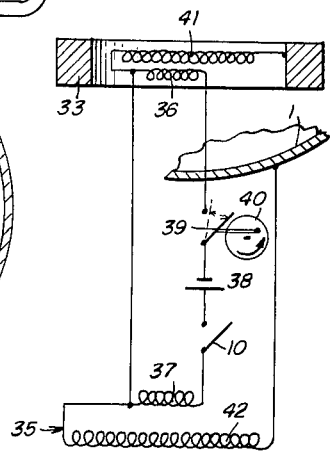

Further objects and advantages will become apparent from the following detailed description of several embodiments of this invention in conjunction with the appended drawings in which:

FIGS. 1 through 7 are diagrammatic cross-sections of tanks for containing liquids respectively illustrating several different embodiments of this invention;

FIGS. 8 through 10 are partial elevational views of various different embodiments of central electrodes which can be employed in place of those shown in FIGS. 6 and 7; and FIG. 11 is a diagrammatic cross-section of a three tank system embodying a further application of this invention; and FIG. 12 is a diagrammatic view of an advantageous means of producing a high voltage potential between a central electrode and a surrounding tank.

In general, this invention comprises subjecting a dielectric liquid in a zero-gravity field to a non-uniform electric field to thereby move said liquid toward the vicinity of greatest intensity of said electric field and, in addition, comprises the location of liquid removal means at said vicinity of greatest electric field intensity. Another feature of this invention comprises the provision of venting means in the vicinity of lowest intensity of said electric field to thereby permit equalization of gas pressure, e.g., in an enclosed tank system.

This invention is based on the phenomenon that a dielectric medium experiences a force when under the influence of a non-uniform electric field. This phenomenon is aptly termed dielectrophoresis which can be defined as the motion of matter caused by polarization effects in a non-uniform electric field and differs from electro-osmosis which acts through charged particles. For example, the order of magnitude of this force on a typical liquid dielectric in a cylindrical electric field has been computed to be 40 gm./cc. at a radial distance of 1 cm. and a potential difference of $10^6$ volts between a two foot diameter bounding cylinder (e.g., the fuel tank) and the center of the cylinder (e.g., a central electrode). The magnitude of this force varies as the inverse cubed radial distance $r^3$ and is proportional to the dielectric constant of the fluid less one and to the density of the fluid.

Dielectric liquids are attracted to the area of greatest field concentration or intensity much more strongly than dielectric gases for two reasons, first, the dielectric constant of a dielectric liquid is at least double that of its vapor or gas, and second, the density of the liquid is usually orders of magnitude greater than that of its vapor or gas. For example, the density of dielectric fluorocarbon liquids is hundreds of times greater than that of its vapor or gas at one atmosphere pressure. In a static zero gravity situation, a vapor bubble in a liquid will experience a pressure away from the center. Consequently, the zero gravity, equilibrium configuration of such a system is a cylindrical core of liquid at the center with a vapor annulus between the liquid core and the tank wall.

Since dielectric fluids have, by definition, very high resistivity, the application of this device requires small quantities of power at high voltage. Furthermore inasmuch as the force imposed on the dielectric is proportional to the gradient of the square of the electric field strength, the direction of the force is not changed by a change in direction of the electric field and is the same in either a direct or an alternating electric field. Moreover, in a zero-gravity field the electric field need not be continuously applied to the dielectric but only at such times that it is desirable or necessary to move said dielectric.

Referring to FIG. 1, there is shown an electrically-conductive, enclosed tank 1 which can be mounted in a space vehicle with the bottom of said tank, as shown, closest to the propulsion system of said vehicle and the top of the tank 1 disposed in the general direction of thrust. The tank 1 is provided with a vent 2 through an intermediate wall thereof, said vent being suitably controlled to prevent escape of contained liquid L but permitting gas flow therethrough to facilitate withdrawal of liquid from said tank by means hereinafter described. At the lower end of the tank 1 there is mounted an acceleration-sensitive valve 3, and a zero-gravity liquid outlet tube 4, connected to the inlet side of said valve and extending therefrom to a central point within the tank 1 as shown. The valve 3 is also connected at its inlet side to the interior of tank 1 through a port 5 and is connected at its outlet side through pipe 6 to the inlet of a pump (not shown) for withdrawing liquid from said tank. Under gravity or acceleration conditions forcing the liquid toward the bottom of tank 1, the valve 3 is operative to connect only port 5 with pipe 6 to the pump, while under zero-gravity conditions said valve is operative to connect only outlet tube 4 with said pipe to the pump.

A central electrode wire or rod 7 is centrally mounted within the tank 1 and insulated therefrom by means of insulators 8 respectively secured to the top and bottom of said tank. The electrode wire or rod 7 is electrically connected to a generator or battery 9 or other suitable source of electrical power and the tank 1 also is electrically connected to said generator or battery so as to provide a voltage potential between said electrode wire or rod and said tank. A switch 10 is provided in the generator or battery circuit to provide on-off control of the potential between the electrode wire or rod 7 and the tank 1.

The liquid contents L of the tank 1, under normal gravity or acceleration conditions, would be disposed in the lower portions of the tank 1 with the vapor contents V disposed in the upper portions of said tank over said liquid contents. Under normal zero-gravity conditions, i.e., prior to the application of a potential between the electrode wire or rod 7 and the tank 1, the liquid contents L, because of wetting characteristics, would tend to be predominantly located on the walls of said tank and the vapor contents V would tend to take on the configuration of a bubble within said liquid contents L. Upon the application of a potential, as by closing switch 10, an electric field having its greatest intensity along the electrode wire or rod 7 is produced, thereby imposing a moving force on the liquid contents L toward said wire or rod. When equilibrium is reached the liquid contents L will have assumed the approximate configuration of a core within an annulus of the vapor contents V substantially as shown in FIG. 1 and the applied potential can be removed by opening switch 10. The approximate equilibrium configuration of the liquid contents L and the vapor contents V, substantially as shown in FIG. 1, will persist in zero-gravity until disturbed by applied or random accelerations. If disturbed, the equilibrium configuration can be obtained again by re-applying the electric field as described above. Of course, the electric field can be continuously applied, if desired, by retaining switch 10 in the closed position.

Figure 2:
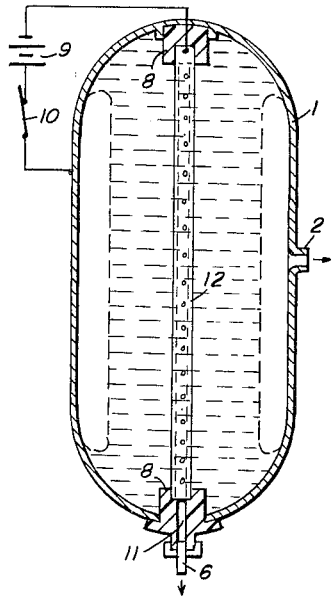

In the embodiment shown in FIG. 2 the tank 1 is provided with a liquid outlet opening 11 in its bottom and the central elecrtode is a perforated tube 12 communicatively connected to said liquid outlet. The vent 2, the insulators 8 secured to the tank 1 for mounting the perforated tube 12, the generator or battery 9 and switch 10 as described above are also provided in this embodiment. The zero-gravity, equilibrium configuration of the liquid contents L and vapor contents V after application of the non-uniform electric field (i.e., by closing switch 10) is substantially as shown in FIG. 2. This embodiment, as well as that shown in FIG. 1, is particularly advantageous in minimizing heat transfer from the tank walls to the liquid contents L. The embodiment shown in FIG. 2 furthermore provides a positive head of appreciable magnitude to the pipe 6 and pump connected thereto thus minimizing cavitation when the pump is started.

Figure 3:
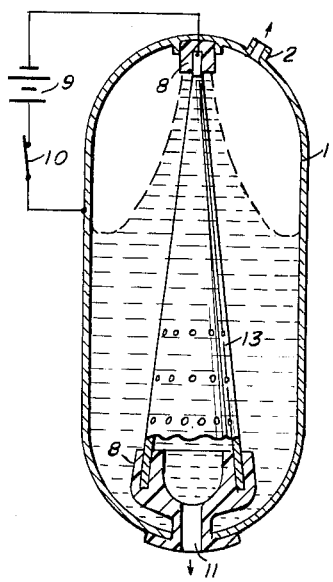

The embodiment shown in FIG. 3 comprises the tank 1 provided with the vent 2 in the upper portion thereof, the liquid outlet 11 in the bottom thereof, and a central electrode in the form of a perforated, hollow cone 13 mounted within said tank by suitably shaped electrical insulators 8 and communicative with said liquid outlet as shown. A source of voltage potential, e.g., battery or generator 9, and switch 10 are provided as described above. The zero-gravity equilibrium condition of the liquid contents L and vapor contents V after application of a non-uniform electric field (i.e., by closing switch 10) is substantially as shown in FIG. 3. This embodiment is particularly advantageous in minimizing impact effects upon re-application of thrust in the upward direction inasmuch as the majority of the liquid contents L are below the vapor contents V.

Figure 4:
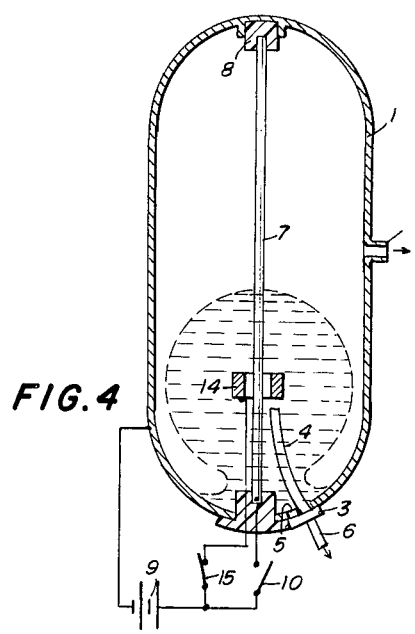

The embodiment shown in FIG. 4 comprises the tank 1 the vent 2 mounted in the intermediate walls thereof the valve 3, the outlet tube 4, the post 5, the central electrode wire or rod 7, the insulators 8, the battery or generator 9 and the switch 10 as described with relation to FIG. 1. In addition, a second electrode in the form of a toroid 14 is suitably mounted in the tank 1 such that it is substantially coaxial with the wire or rod 7 but insulated therefrom. The second electrode or toriod 14 is electrically connected to the battery or generator 9 through a second control switch 15 in a similar manner as the wire or rod 7 is connected to said battery or generator through switch 10.

In this embodiment, the zero-gravity, equilibrium configuration is similar to that shown in FIGS. 1 and 2 after a non-uniform electric field has been created by closing switch 10 with switch 15 open. The zero-gravity, equilibrium configuration after closing switch 15 with switch 10 open is substantially as shown in FIG. 4. This embodiment is particularly advantageous in minimizing heat transfer effects, as desired (configuration after non-uniform electric field resulting from switch 10 closed and switch 15 open); in minimizing impact effects, as desired, (configuration after non-uniform electric field resulting from switch 10 open and switch 15 closed); and in permitting the choice of more than one configuration, as desired, through the manipulation of one, or the other, or both, of switches 10 and 15.

Figure 5:
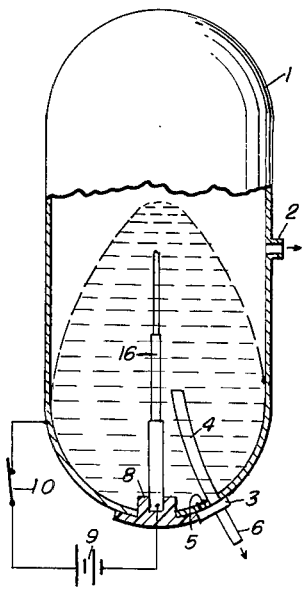

The embodiment of FIG. 5 comprises the tank, the vent 2, the valve 3, the outlet tube 4, the port 5, the pipe 6, the battery or generator 9 and the switch 10 as described in relation to FIG. 1. In this instance the central electrode is a telescoping rod 16 mounted within the tank 1 by means of an insulator 8 secured to the bottom of the tank. Suitable means are provided for extending and retracting said telescoping rod. This embodiment permits the movement and variation of the non-uniform electric field formed within the tank 1 to change the configuration from that substantially shown in FIGS. 1 and 2, when the telescoping rod 16 is fully extended but not touching the top of tank 1, to the configuration substantially as shown in FIG. 5 when said telescoping rod is partially retracted. Upon full retraction of telescoping rod 16, the liquid contents L are drawn toward the bottom of tank 1. This embodiment provides a broader range of selectivity in positioning the liquid contents L with particular advantages of minimizing impact effects and/or heat transfer effects, as desired.

The embodiment illustrated in FIG. 6 comprises the tank 1, the vent 2, the battery or generator 9 and the switch 10. The central electrode in this embodiment is a perforated hollow sphere 17 mounted in the tank 1 on the pipe support 18 as shown. The pipe support 18 communicates with the interior of the perforated hollow sphere 17 to receive liquid L passing into said sphere and convey it out of the tank 1, for example, to a pump or other apparatus. The pipe support 18 is mounted by means of electrical insulator 8 secured to the bottom of the tank 1. In addition, pipe support 18 is electrically conductive as is the sphere 17 and is connected to battery or generator 9, which in turn is connected through switch 10 to the tank 1. The zero gravity, equilibrium configuration of the liquid contents L is substantially as shown in FIG. 6 after switch 10 has been closed to apply a voltage potential between sphere 17 and the tank 1, thus creating a non-uniform field within said tank.

FIG. 7 illustrates an additional embodiment of this invention wherein two perforated hollow spheres 17 are provided with respective pipe support 18 mounted in the tank 1 by means of respective insulators 8 and are electrically connected through respective switches 10 to a battery or generator 9 substantially as described in relation to FIG. 6. The zero gravity equilibrium configuration after both switches 10 have been closed to create two non-uniform electric fields within the tank 1 is substantially as shown in FIG. 7.

Instead of the perforated hollow sphere 17 as shown in FIGS. 6 and 7, a ball of metal wool 19, such as steel wool, can be employed as shown in FIG. 8 or electrically conductive wire helically wound into a spherical shape 20 as shown in FIG. 9 can be employed or a spherical electrically conductive grating 21 as shown in FIG. 10 can be employed.

An additional embodiment is shown in FIG. 11 wherein stacked spherical tanks 22, 23 and 24, respectively numbered from the bottom up, are provided with electrically non-conductive vapor vent lines 25 communicatively connecting the upper interior portion of each tank with the upper interior portion of the next succeeding tank. An electrically non-conductive conduit 26 passes upwardly through each tank, communicatively connected at its uper end to a perforated hollow sphere 27 and at its lower end to pump (not shown). The conduit 26 is further provided with holes 28 opening into lower portions of each of the tanks 22, 23 and 24 to permit the passage of liquid contained by each of said tanks into the conduit 26. Tanks 22 and 23 have mounted in the central portions thereof toroidal electrodes 29. The perforated sphere 17 mounted on the upper end of conduit 26 and the toroidal electrodes 29 are connected to a battery or generator 9 as shown. Each of the tanks 22, 23 and 24 are electrically connected to the battery or generator 9, respectively, through switches 30, 31 and 32, such that the closing of said switches will create an electric field within the tank 22, 23 and/or 24 with which the closed switch is associated.

The embodiment shown in FIG. 11 illustrates one manner in which the present invention can be applied to a system comprising a plurality of tanks. The vapor vent lines 25 permit equalization of gas pressure in each of the tanks 22, 23 and 24 and the conduit 26 conveys liquid contents of each tank passing through holes 28 to a pump or other apparatus connected to the lower end of said conduit.

FIG. 12 illustrates a high voltage source for providing a high voltage potential between a centrally mounted electrode, e.g., the toroidal electrodes 14 and 29 of FIGS. 4 and 11, or the spherical electrode 27 of FIG. 11 without the necessity of a high voltage wire or other high voltage conducting means leading from the central electrode to a generator or battery outside of the tank 1, 22 or 23. Such a high voltage wire or conducting means affects the electric field formed and, in particular, can be regarded as a part of the central electrode. In those instances where it is desired to eliminate or minimize this effect of the conducting wire to the central electrode and thus control the zero-gravity equilibrium configuration by the size, shape and disposition only of the central electrode, the arrangement of FIG. 12 can be employed. There is shown in FIG. 12 a central electrode 33, in this instance the toroidal electrode as shown in FIGS. 4 and 11, centrally mounted within a tank 1. An electrode transformer 34 is mounted within the central electrode and a tank transformer 35 is mounted outside of the tank 1. The low voltage winding 36 of the electrode transformer 34 are connected in series with the low voltage winding 37 of the tank transformer 35, an on-off control switch 10, a low voltage source of electricity 38, e.g., a low voltage battery, and a circuit breaker 39 which is activated by an eccentric 40 so as to provide an activated magnetic field in the transformers 36 and 37. The high voltage winding 41 of the electrode transformer 34 is connected at one end to the central electrode 33 and at the other end to the high voltage winding 42 of the tank transformer 35. The remaining end of the high voltage winding 42 of the tank transformer 35 is connected to the tank 1.

In operation, the switch 10 is closed when it is desirded to position the liquid contents of the tank 1 and the eccentric 40 operates to supply intermittent current and low voltage to the low voltage windings 36 and 37 which in turn induce a high voltage in the high voltage windings 41 and 42 to thereby produce a high voltage potential between the electrode 33 and the tank 1, resulting in an electric field to position the liquid contents. Because of the low voltage in the connecting wires from the electrode transformer 34 to the power source 38 outside of the tank 1, little or no effect on the resulting electric field is caused by said connecting wires. Other means of inducing low voltage power in the low voltage windings 36 and 37 can be obviously employed in place of the battery 38, circuit breaker 39 and eccentric 40.

In each of the embodiments disclosed hereinabove, it will be noted that the cooler portions of the liquid are most strongly attracted to the central electrodes 7, 12, 13, 14, 16, 17, 19, 20, 21, 27 and 29 since the dielectric constant of said liquid decreases with increasing temperature and thus said cooler portions are more strongly attracted toward the greatest electric field intensity. Consequently the devices of the present invention can be employed to preferentially locate the coolest portions of the liquid about the outlets from the tank to connected pumps or other apparatus. As particularly shown in FIGS. 1 and 2, the advantage of minimized heat transfer is obtained by operation of this invention in that the vapor having a low dielectric constant locates adjacent the wall of the tank and thus heat-insulates the liquid core within. Additionally, the heat transfer through the liquid itself is minimized in that the cooler portions of the liquid locate closer to the electrode, thus producing smaller temperature gradients, and thus lower heat transfer from the vapor through the liquid toward the central electrode.

Many modifications and variations can be made regarding the specific structure and form of the embodiments described above without departing from the spirit or scope of this invention.

What is claimed is:

1. Apparatus for selectively positioning a dielectric liquid in a zero-gravity field comprising containing means for containing said liquid, generating means for generating a non-uniform electric field having its greatest field intensity in the vicinity of the position desired for said liquid, said containing means having an outlet in the vicinity of said greatest intensity.

2. Apparatus for selectively positioning a dielectric liquid in a zero-gravity field comprising containing means for containing said liquid, generating means for generating a non-uniform electric field having its greatest field intensity in the vicinity of the position desired for said liquid, said containing means having an outlet in the vicinity of said greatest field intensity and control means for activating and deactivating said generating means.

3. Apparatus for selectively positioning a dielectric liquid in a zero-gravity field comprising generating means for generating a non-uniform electric field having its greatest field intensity in the vicinity of the position desired for said liquid and pump means for withdrawing said liquid from the vicinity of greatest field intensity.

4. Apparatus for selectively positioning a dielectric liquid in a zero-gravity field comprising generating means for generating a non-uniform electric field having its greatest field intensity in the vicinity of the position desired for said liquid and its lowest field intensity in the vicinity where no liquid is desired and vent means for venting the vicinity of lowest field intensity.

5. Apparatus for selectively positioning a dielectric liquid in a zero-gravity field comprising generating means for generating a non-uniform electric field having its greatest field intensity in the vicinity of the position desired for said liquid and its lowest field intensity in the vicinity where no liquid is desired, pump means for withdrawing said liquid from the vicinity of greatest field intensity and vent means for venting the vicinity of lowest field intensity.

6. Apparatus for selectively positioning a dielectric liquid in a zero-gravity field comprising generating means for generating a non-uniform electric field having its greatest field intensity in the vicinity of the position desired for said liquid and its lowest field intensity in the vicinity where no liquid is desired, control means for activating and deactivating said generating means, pump means for withdrawing said liquid from the vicinity of greatest field intensity and vent means for venting the vicinity of lowest field intensity.

7. Apparatus for selectively positioning a dielectric liquid in a zero-gravity field comprising an enclosed electrically conductive tank, an electrode disposed within said tank and electrically insulated therefrom and a source of high voltage electric power electrically connected to said electrode and tank to provide a high voltage potential between said electrode and tank and thereby generate a non-uniform electric field within said tank.

8. Apparatus as claimed in claim 7 wherein the electrode comprises an electrically conductive, solid cylindrical member.

9. Apparatus as claimed in claim 7 wherein the electrode comprises a perforated tube.

10. Apparatus as claimed in claim 7 wherein the electrode comprises a perforated hollow cone.

11. Apparatus as claimed in claim 7 wherein the electrode comprises a toroid.

12. Apparatus as claimed in claim 7 wherein the electrode comprises a toroid and an electrically conductive cylindrical member disposed axially within said toroid and electrically insulated therefrom.

13. Apparatus as claimed in claim 7 wherein the electrode comprises a perforated sphere.

14. Apparatus as claimed in claim 7 wherein the electrode comprises a ball of metal wool.

15. Apparatus as claimed in claim 7 wherein the electrode comprises wire helically wound in a spherical configuration.

16. Apparatus as claimed in claim 7 wherein the electrode comprises a spherical grating.

17. Apparatus as claimed in claim 7 wherein the electrode comprises a telescoping electrode.

18. Apparatus as claimed in claim 7 wherein said electrode comprises two perforated spheres.

19. Apparatus for selectively positioning a dielectric liquid in a zero-gravity field comprising a plurality of electrically conductive enclosed tanks having their normally upper portions connected for passage of gases between said tanks and having their normally lower portions connected for the passage of liquids between said tanks, an electrode disposed within each of said tanks and electrically insulated therefrom and electrical means electrically connected to said electrodes and said tanks for providing a voltage potential between each said electrode and said tank within which it is disposed to thereby create a non-uniform electric field within each said tank.

20. Method for selectively positioning a dielectric liquid in a zero-gravity field comprising the step of generating a non-uniform electric field having its greatest field intensity in the vicinity of the position desired for said liquid.

21. Apparatus as claimed in claim 7 wherein the source of high voltage electric power comprises an electrode transformer adjacent said electrode within said tank, a tank transformer outside of said tank, each of said transformers having a high voltage winding and a low voltage winding, one end each of said high voltage windings being interconnected, the other end of the high voltage winding of said electrode transformer being connected to said electrode and the other end of the high voltage winding of said tank transformer being connected to said tank, and low voltage electric power means connected in series circuit with both said low voltage windings of said electrode transformer and said tank transformer for providing varying low voltage electrical power thereto, thereby inducing high voltage power in said high voltage windings.

22. Apparatus claimed in claim 1 wherein said generating means includes a source of D.C. power.

23. Method claimed in claim 20 wherein said generating step utilizes D.C. power.

References Cited by the Examiner

UNITED STATES PATENTS 2,851,618   9/58   Krawinkel _____ 310—2

M. CARY NELSON, *Primary Examiner.*

MILTON O. HIRSHFIELD, *Examiner.*